United States Patent [19]

Guenther

[11] 4,287,691

[45] Sep. 8, 1981

[54] BASE CONSTRUCTION FOR GRAIN BINS AND THE LIKE INCLUDING MOISTURE SEALING MEANS

[76] Inventor: Bernard Guenther, 117-6th Ave., N., Yorkton, Saskatchewan, Canada

[21] Appl. No.: 84,667

[22] Filed: Oct. 15, 1979

[30] Foreign Application Priority Data

Oct. 20, 1978 [CA] Canada ................................. 313849

[51] Int. Cl.³ ............................................ E04D 13/00
[52] U.S. Cl. ......................................... 52/97; 52/192; 52/247; 52/294
[58] Field of Search ............ 52/247, 192, 294, 169.14, 52/97, 293, 58, 245

[56] References Cited

U.S. PATENT DOCUMENTS

| | | | |
|---|---|---|---|
| 3,388,514 | 6/1968 | Archival et al. | 52/97 |
| 3,426,445 | 2/1969 | Steffen | 52/247 X |
| 3,685,232 | 8/1972 | Steffen | 52/245 X |
| 4,176,504 | 12/1979 | Huggins | 52/293 X |

*Primary Examiner*—Carl D. Friedman
*Attorney, Agent, or Firm*—Stanley G. Ade

[57] ABSTRACT

One embodiment of the present device includes a perimetrical shield or flashing secured between the lower edge of the wall and the conventional outwardly facing angle iron base secured to the floor. Shield is bolted or riveted between the wall and the angle iron and extends over and preferably slightly below the lower perimetrical edge of the floor of the bin. Another embodiment includes the shield situated between the wall and an inwardly facing perimetrical angle iron which is easy to manufacture and is less likely to provide moisture ingress. A further embodiment includes the shield being formed as an extension of the wall and being shaped to extend over and slightly below the perimetrical edge of the floor and to be bolted either to the floor or to the angle iron.

4 Claims, 13 Drawing Figures

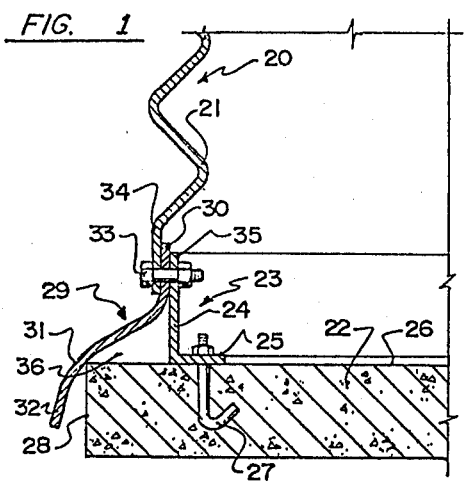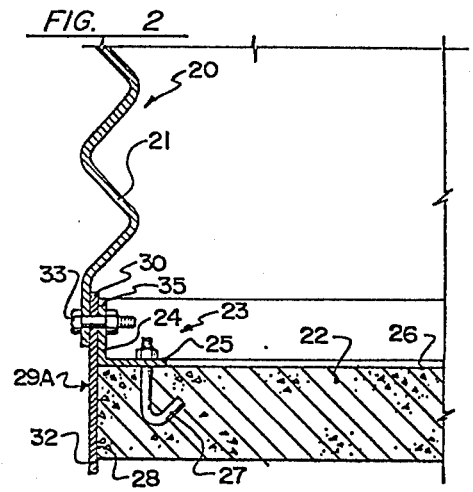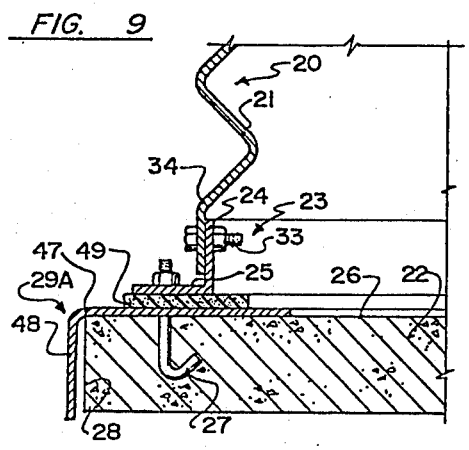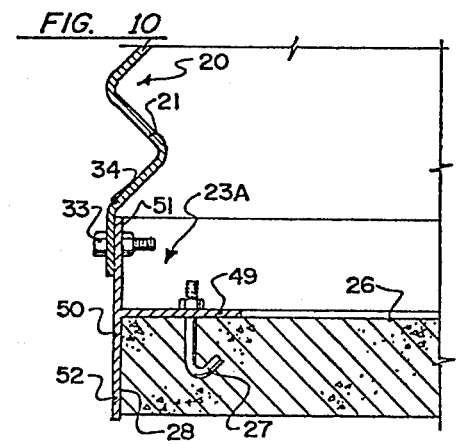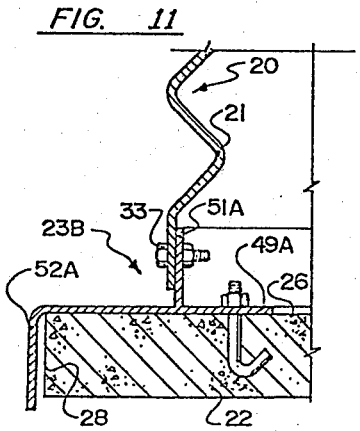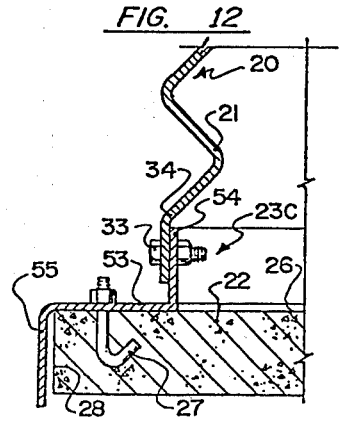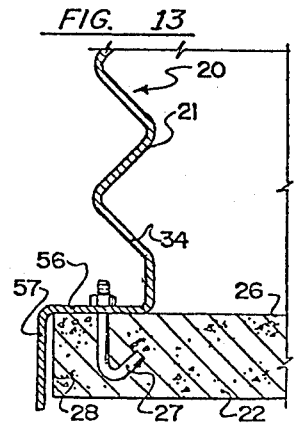

BASE CONSTRUCTION FOR GRAIN BINS AND THE LIKE INCLUDING MOISTURE SEALING MEANS

BACKGROUND OF THE INVENTION

This invention relates to new and useful improvements in grain bin construction, particularly construction of grain bins adjacent the base and floor area thereof which is normally subject to the ingress of moisture with subsequent damage occurring to grain stored therein.

Normally, a base is provided upon which an outwardly facing angle iron is secured. The lower perimetrical edge of the grain bin engages the outer surface of the vertical flange of the angle iron and is bolted thereto with or without a sealant being provided. However, it will be appreciated that such a construction is difficult to seal both between the wall of the grain bin and the vertical flange of the angle iron and, more importantly, between the horizontal flange of the angle iron and the floor of the bin which is normally made of concrete.

Consequently, moisture often seeps into the grain bin from the exterior thereof and causes the grain to become damp, particularly the grain adjacent the lower perimetrical corners of the grain bin. This not only causes grain spoilage, but also may induce the generation of heat with the subsequent damage and possibility of fire occurring.

SUMMARY OF THE INVENTION

The present invention overcomes these disadvantages by providing a grain bin including in combination a perimetrical wall, a floor including an upper, substantially horizontal surface portion and an outer, substantially vertical perimetrical edge portion, and means to secure said wall of said floor adjacent the lower perimetrical edge portion of said wall and water impervious shield means extending from adjacent said lower edge of said wall over the perimetrical edge portions of said floor and downwardly to cover the vertical edge portion of the floor in moisture shedding relationship, said means to secure said wall to said floor including a member extending around said floor adjacent the perimeter thereof, said member including an upwardly extending flange and a horizontal flange, said member being secured to said floor by said horizontal flange and to said wall by said upwardly extending flange, said shield means being secured to said wall and extending over the perimetrical edge of said floor and downwardly therefrom.

Another advantage of the invention is to provide a device of the character herewithin described which can either be incorporated in existing grain bin constructions or can be incorporated in new grain bin construction.

Another advantage of the invention is to provide a device of the character herewithin described which, in one embodiment may provide a moisture shedding construction formed from the lower perimetrical wall of the grain bin per se.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a fragmentary cross sectional view of the junction between the lower end of the bin wall and the floor with one embodiment of the invention incorporated therein.

FIG. 2 is a view similar to FIG. 1, but showing an alternative embodiment.

FIG. 9 is a view similar to FIG. 1, but showing a further embodiment.

FIG. 10 is a view similar to FIG. 1, but showing a further embodiment.

FIG. 11 is a view similar to FIG. 1, but showing a further embodiment.

FIG. 12 is a view similar to FIG. 1, but showing a further embodiment.

FIG. 13 is a view similar to FIG. 1, but showing a further embodiment.

In the drawings like characters of reference indicate corresponding parts in the different figures.

DETAILED DESCRIPTION

Figure 3:
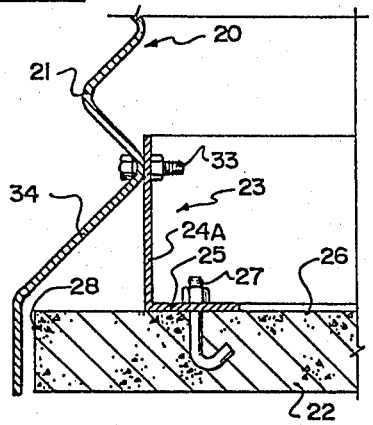
FIG. 3 is a view similar to FIG. 1, but showing a further embodiment.

Proceeding therefore to describe the invention in detail, reference should first be made to FIG. 1 in which reference character 20 illustrates the lower corner or perimetrical portion of a grain bin which includes a substantially vertical wall 21 formed in this instance of corrugated metal, secured upon a substantially horizontal floor 22 which is normally formed from concrete. However, it will be appreciated that both the floor and the grain bin wall can be manufactured from other materials, if desired.

Means are provided to secure the grain bin wall 21 to the floor and in FIG. 1 consists of a member collectively designated 23. In this embodiment, the member is in the form of an angle iron having a substantially vertical flange 24 and a substantially horizontal flange 25 with the horizontal flange 25 facing inwardly of the bin wall 21.

The perimetrically extending flange 23 is secured to the upper surface 26 of the floor by means of bolt means 27 although other fastening means can be provided.

It is situated spaced slightly inwardly from the outer perimetrical edge 28 of the floor 22 as clearly shown and a shield collectively designated 29 is provided as will hereinafter be described. In this particular embodiment, the shield is preferably made of sheet metal but synthetic plastic or other suitable material can be used. It includes the substantially perimetrically extending vertical portion 30 which then curves downwardly and outwardly over the outer corner 31 of the floor and then extends outwardly and downwardly at an angle indicated by reference character 32 as clearly illustrated. It is secured as by bolt assembly 33 or the equivalent, between the lower perimetrical edge portion 34 of the wall and adjacent the upper perimetrical edge 35 of the vertical flange 24 of the member 23 and it will be appreciated that suitable sealant (not illustrated) may be provided between the wall and the shield and between the shield and the vertical flange as well as between the horizontal flange 25 and the floor 26.

This provides a water or moisture shedding configuration so that there is no possibility of moisture lodging in the area indicated by reference character 36 which is normal and which provides the ingress of moisture under certain conditions.

The other figures of the drawings show variations of this construction and where applicable, corresponding reference characters have been used.

In FIG. 2, the inwardly facing angle iron member 23 is situated quite close to the outer perimetrical edge 28 of the floor so that the shield 29A, in this embodiment, is substantially vertical and extends from between the wall 21 of the bin and the vertical flange 24 of the member 23, substantially vertically over the perimetrical edge 28 of the floor, as clearly illustrated. Once again the necessary sealant materials are preferably provided.

It will, of course, be appreciated that shield 29A could be made integral with and as an extension of the lower side of the wall 21 and the construction illustrated in FIG. 2 and described herein is considered to include this alternative even although it is not illustrated specifically.

In FIG. 3, the member 23 is provided with a vertical flange 24A which is substantially longer than the horizontal flange 25. In this embodiment, the lower perimetrical portion 34 of the wall is extending downwardly and over the perimetrical edge 28 of the floor and acts directly as the shield, as clearly illustrated. Once again, as in all the embodiments, desirable sealing materials may be used and in fact are preferable, but not essential. However, it is desirable if only to seal the bolt assemblies 33 where they pass through various components.

Figure 4:
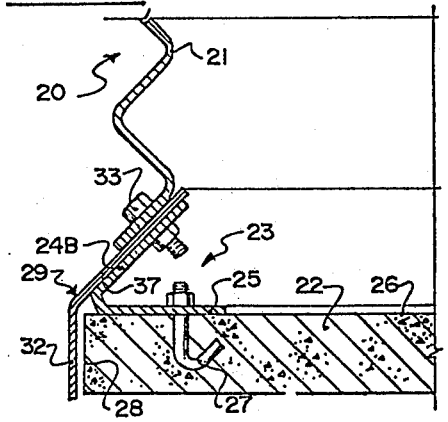
FIG. 4 is a view similar to FIG. 1, but showing a further embodiment.

FIG. 4 shows an embodiment in which the member 23 is in the form of a V-shaped angle iron with the substantially vertical portion 24B curving inwardly and upwardly as clearly shown and with the shield 29 including the diagonally directed portion 37 terminating in the downturned flanged portion 32.

Figure 5:
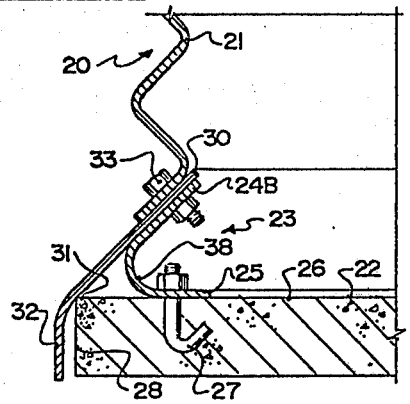
FIG. 5 is a view similar to FIG. 1, but showing a further embodiment.

FIG. 5 shows a similar configuration to FIG. 4 except that the member 23 may be formed rather than cast or rolled with the angle between the substantially vertical and horizontal portions being curved as indicated by reference character 38.

Figure 6:
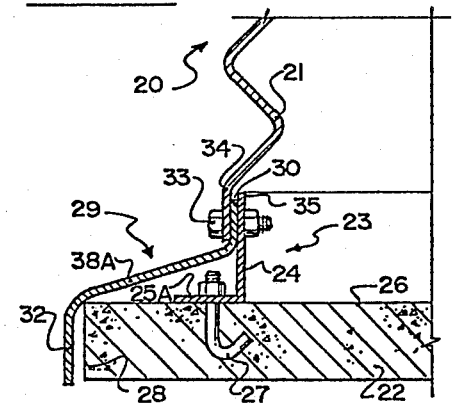
FIG. 6 is a view similar to FIG. 1, but showing a further embodiment.

FIG. 6 shows a construction similar to FIG. 1 with the exception that the member 23 is in the form of an angle iron with vertical flange 24 and a horizontal flange 25A which extends outwardly towards the perimetrical edge of the floor rather than inwardly as shown in previous embodiments.

This construction is often found in existing grain bins so that the shield collectively designated 29 is readily added to existing bins by bolting same between the lower perimetrical edge portion 34 of the wall and the vertical flange 24 in a manner similar to that hereinbefore described. In this embodiment, the shield 29 includes the substantially vertical portion 30, the outwardly and downwardly extending portion 38, and the floor edge overlapping portion 32.

Figure 7:
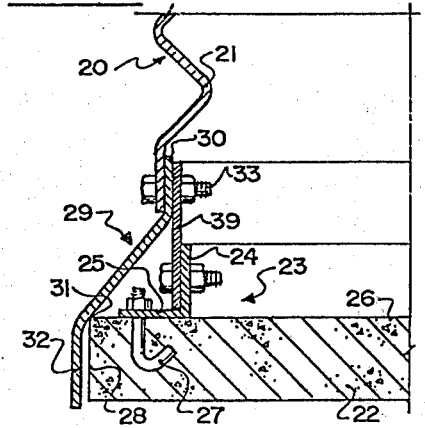
FIG. 7 is a view similar to FIG. 1, but showing a further embodiment.

FIG. 7 also shows an outwardly facing angle iron member 23 with a perimetrical connector member 39 bolted to the vertical flange of member 23 and extending upwardly therefrom. The bin wall and the upper portion of the shield 29 are bolted adjacent the upper end of this perimetrical connector 39 as clearly shown.

Figure 8:
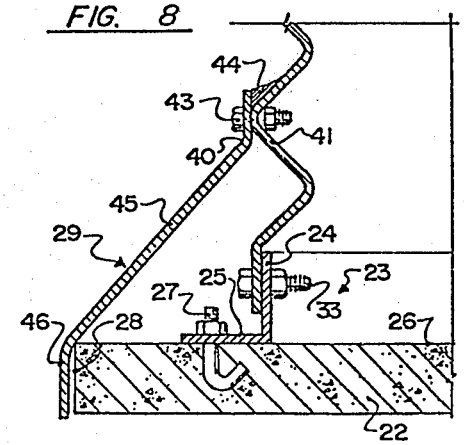
FIG. 8 is a view similar to FIG. 1, but showing a further embodiment.

In FIG. 8, the member 23 is situated inwardly of the perimetrical edge of the floor and the bin wall is secured to the vertical flange 24 thereof in the conventional manner. The member 23 is secured to the floor by means of a horizontal flange 25 as hereinbefore described.

The shield 29, in this embodiment, includes a curved upper portion 40 shaped to fit one of the outwardly curving corrugations 41 of the wall and is bolted thereto by means of bolt connector 43 with sealant or caulking 44 being situated between the curved portion 40 and the wall portion 41. Alternatively, of course, it will be appreciated that the portion 40 can be shaped to fit one of the inwardly curving corrugations but this construction is not illustrated.

This shield then extends outwardly and downwardly in a diagonal direction as indicated by reference character 45 and terminates in a vertically extending portion 46 which extends over the outer perimetrical edge 28 of the floor of the bin, as clearly shown. Once again this embodiment is readily added to existing constructions.

In FIG. 9, which shows conventional construction, the shield collectively designated 29A is situated between the horizontal flange 25 of the member 23 and the upper surface 26 of the floor 22. This shield includes the horizontal portion 47 extending outwardly to the perimetrical edge 28 of the floor and then extends downwardly in a substantially vertical flange 48 as clearly shown.

A rubber seal or similar type seal 49 is situated between the horizontal flange 25 of member 23 and the horizontal portion 47 of the shield 29A, for sealing purposes.

In FIG. 10, the member 23A is in the form of a perimetrically extending T-bar having a horizontal flange 49 engaging the upper surface 26 of the floor and being secured thereto by means of bolt assemblies 27. The vertical flange 50 of the T-bar is situated at the outer edge of the horizontal flange 49 and includes the upwardly extending portion 51 and the downwardly extending portion 52. The upwardly extending portion 51 is bolted to adjacent the lower perimetrical edge portion 34 of the wall and on the inner surface thereof, whereas the lower portion 52 extends over the perimetrical edge 28 of the floor and acts as the aforementioned shield.

FIG. 11 shows a construction similar to FIG. 10 with the exception that the vertical portion 51A is spaced inwardly from the vertical portion 52A, thereby extending upwardly from intermediate the inner and outer edges of the horizontal portion 49A of the member 23B with the bin wall being secured to the vertical portion 51A on the outside thereof and the vertical portion 52A extending downwardly over the perimetrical edge 28 of the floor and acting as the shield.

FIG. 12 shows member 23C in the form of a double angulated member where a horizontal portion 53 engaging the upper surface 26 of the floor 22 and being secured thereto by bolt assemblies 27 as hereinbefore described.

A vertical flange 54 extends upwardly from the inner edge of the horizontal portion 53 and the bin wall portion 34 is bolted thereto as clearly illustrated.

A vertical flange portion 55 extends downwardly from the outer edge of the horizontal portion 53 over the perimetrical edge 28 of the floor and acts as the shield, once again as clearly illustrated.

FIG. 13 shows a construction which is particularly suitable for prime manufacture. In this embodiment, the lower wall portion 34 of the bin wall is angulated outwardly to form a horizontal flange 56 which engages the upper surface 26 of the floor 22 and is bolted thereto by means of nut and bolt assemblies 27. A vertical flange portion 57 is formed on the outer edge of the horizontal portion 56 and extends downwardly over the perimetrical edge 28 of the floor thus acting as the shield.

In all instances, the nut and bolt assemblies 27 are preferred, but other means of fastening can be used.

In all instances, the member 23, etc., is preferably formed in sections and bolted together as it is assembled upon the floor of the grain bin. This is particularly so if the grain bin is cylindrical in configuration.

Although the term "angle iron" has been used, nevertheless it will be appreciated that members 23, etc., can be formed from steel, aluminum, plastic or any other suitable material and the term "angle iron" is inclusive.

Since various modifications can be made in my invention as hereinabove described and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A grain bin including in combination a perimetrical wall, a floor including an upper, substantially horizontal surface portion and an outer, substantially vertical perimetrical edge portion, means to secure said wall to said floor adjacent the lower perimetrical edge portion of said wall and water impervious shield means extending from adjacent said lower edge of said wall oer the perimetrical edge portions of said floor and downwardly to cover at least the upper portion of the vertical edge portion of the floor in moisture shedding relationship, said means to secure said wall to said floor including a member extending around said floor adjacent the perimeter thereof, said member including an upwardly extending flange and a horizontal flange, said member being secured to said floor by said horizontal flange and to said wall by said upwardly extending flange, said shield means being secured to said wall outboard of said upwardly extending flange and extending over the perimetrical edge of said floor and downwardly therefrom and including a downwardly and outwardly sloping portion for water shedding action, said sloping portion extending from the junction of said shield means and said wall.

2. The grain bin according to claim 1 in which said horizontal flange faces outwardly.

3. The grain bin according to claim 1 in which said horizontal flange faces inwardly.

4. The grain bin according to claim 1, 2 or 3 which includes a perimetrically extending connecting strip secured to the upwardly extending flange of said member and extending upwardly therefrom, said wall and said shield being secured to adjacent the upper edge of said perimetrical connecting strip.

* * * * *